United States Patent
Matsuda et al.

(10) Patent No.: US 6,756,113 B2
(45) Date of Patent: Jun. 29, 2004

(54) MAGNETIC RECORDING MEDIUM AND MANUFACTURING METHOD THEREOF

(75) Inventors: Yoshibumi Matsuda, Hiratsuka (JP); Koji Sakamoto, Odawara (JP); Tetsuya Kanbe, Odawara (JP); Yotsuo Yahisa, Odawara (JP)

(73) Assignee: Hitachi Storage Technologies Japan, Ltd., Kanagawa-ken (JP)

(*) Notice: Subject to any disclaimer, the term of this patent is extended or adjusted under 35 U.S.C. 154(b) by 47 days.

(21) Appl. No.: 10/077,880

(22) Filed: Feb. 20, 2002

(65) Prior Publication Data

US 2002/0197515 A1 Dec. 26, 2002

(30) Foreign Application Priority Data

Jun. 26, 2001 (JP) ........................................ 2001-192190

(51) Int. Cl.⁷ .............................. G11B 5/66; G11B 5/70; H01J 1/00
(52) U.S. Cl. ........................ 428/336; 428/611; 428/668; 428/678; 428/694 TS; 428/694 TM; 428/900
(58) Field of Search .................... 428/694 TS, 694 TM, 428/336, 611, 668, 675, 900

(56) References Cited

U.S. PATENT DOCUMENTS 4,652,499 A    3/1987 Howard ..................... 428/641
6,383,668 B1 *  5/2002 Fullerton et al. ..... 428/694 TM
2002/0160234 A1 * 10/2002 Sakawaki et al. ....... 428/694 TS

FOREIGN PATENT DOCUMENTS

| JP | 63-197018 | 8/1988 |
| JP | 10-143865 | 5/1998 |
| JP | 11-306532 | 11/1999 |
| JP | 2000-503448 | 3/2000 |
| JP | 2001-148110 | 5/2001 |
| WO | WO98/06093 | 2/1998 |

* cited by examiner

Primary Examiner—Holly Rickman
(74) Attorney, Agent, or Firm—Mattingly, Stanger & Malur, P.C.

(57) ABSTRACT

A magnetic recording medium includes a first underlying film of a NiTa alloy having a nonmagnetic amorphous structure and formed on a nonmagnetic substrate, and a second underlying film made of an alloy containing Cr and Ti, further a first magnetic film of a CoCrPt alloy, a nonmagnetic intermediate film of Ru and a second magnetic film of a CoCrPtB alloy that are serially formed over the first underlying film, wherein oxygen locally exists in an interface between the first underlying film and the second underlying film.

3 Claims, 4 Drawing Sheets

FIG. 6

| | SECOND UNDERLYING FILM | | PO2·t (mPa·SEC) | Mrt (T·m) | Hr (kA/m) | S/N (dB) | Re (%) |
|---|---|---|---|---|---|---|---|
| | ALLOY COMPOSITION | FILM THICKNESS (nm) | | | | | |
| EXAMPLE 1 | 85at%Cr-15at%Ti | 5 | 24 | 3.71 | 392 | 28.9 | 55.5 |
| EXAMPLE 2 | 82at%Cr-15at%Ti-3at%B | 10 | 32 | 3.67 | 386 | 30.0 | 54.9 |
| EXAMPLE 3 | 82at%Cr-15at%Ti-3at%B | 15 | 32 | 3.99 | 446 | 29.2 | 57.7 |
| COMP. EXAMPLE 1 | 85at%Cr-15at%Ti | 5 | NO SUPPLY | 3.21 | 332 | 23.4 | 47.6 |
| COMP. EXAMPLE 2 | 82at%Cr-15at%Ti-3at%B | 10 | NO SUPPLY | 3.29 | 305 | 20.9 | 44.6 |
| COMP. EXAMPLE 3 | 77at%Cr-20at%Ti-3at%B | 10 | 32 | 3.59 | 437 | 27.9 | 54.3 |

MAGNETIC RECORDING MEDIUM AND MANUFACTURING METHOD THEREOF

BACKGROUND OF THE INVENTION

1. Field of the Invention

This invention relates to a magnetic recording medium of an information storage device. More particularly, this invention relates to a magnetic recording medium suitable for achieving a high recording density and a manufacturing method of the magnetic recording medium.

2. Description of the Related Art

As an information-oriented society has made steady progress, the quantity of information that is exchanged everyday has kept on increasing. With this trend, requirements for higher recording density and greater memory capacity of information storage devices have no limits.

Magnetic recording media that have been put into practical application at present employ alloys using Co as the principal component such as Co—Cr—Pt—B and Co—Cr—Pt—Ta as a magnetic film. The Co alloys assume a hexagonal closed packed structure (hcp structure) with its easy axis extending in a c-axis direction. Therefore, crystallographic orientation in which the c-axis of the Co alloy assumes an in-plane direction, that is, a (11.0) orientation, is desirable as a longitudinal magnetic recording medium that executes recording by reversing magnetization inside the plane of the magnetic film. Because the (11.0) orientation is unstable, however, this orientation is not generally achieved even when the Co alloy is directly formed on a substrate.

Therefore, means has been taken that forms a (100)—oriented Cr underlying film before a Co alloy magnetic film is formed, by utilizing the property of the Cr (100) plane assuming a body-centered cubic structure (bcc structure) in that it has high matching with the Co (11.0) plane, and then epitaxially grows a Co alloy magnetic film on the Cr underlying film so that the c-axis of the Co alloy magnetic film faces in the in-plane direction.

To further improve crystal lattice matching in an interface between the Co alloy magnetic film and the Cr underlying film, means that adds a second element to Cr and increases the lattice gap of the Cr underlying film has been employed. This means can further increase the (11.0) orientation of the Co alloy magnetic film and its coercivity. As examples of such technologies, JP-A-62-257618 (U.S. Pat. No. 4,652,499) and JP-A-63-197018 both disclose adding V, Ti and the like.

JP-A-11-306532 describes that when a NiTa film or a NiNb film is formed below the underlying film, the (11.0) orientation of the Co alloy magnetic film can be acquired and high recording density can be achieved. Further, JP-A-2000-503448 (officially pronounced unexamined publication) and JP-A-10-143865 describe a method that exposes a first underlying film to a predetermined oxidizing atmosphere and then forms a second underlying film as means for rendering crystal grains of a Co alloy magnetic film fine and for accomplishing the (11.0) orientation.

The factors that are necessary for achieving high recording density are high coercivity and low noise. A magnetoresitive head having extremely high reproduction sensitivity and therefore suitable for high density recording technologies has been mainly used, but when the magnetoresistive head is used, the sensitivity not only to reproduction signals from the magnetic recording medium but also to the noise becomes high. Therefore, the recording medium must have lower noise than ever.

To reduce the noise of the recording medium, it is known effective to render the crystal grains in the magnetic film fine and to uniform the crystal grain diameters. WO98/06093 re-published describes that a CrTiB alloy is effective for an underlying film for rendering the crystal grains of the magnetic film fine.

Improvement of thermal stability is another important factor in the magnetic recording medium. Thermal decay is the phenomenon that a reproduction output from the magnetic recording medium drops with passage of time. Thermal decay develops presumably because magnetization of individual crystal grains becomes thermally unstable as the crystal grains are rendered fine.

To solve the problem of this thermal decay, JP-A-2001-148110 proposes a magnetic recording medium that antiferromagnetically couples two magnetic recording layers through a nonmagnetic layer. This coupling is called "AF coupling".

To accomplish a magnetic storage device having a recording density of at least 46.5 Mbit/mm$^2$ (30 Gbit/in$^2$), it is necessary to accomplish a magnetic recording medium having magnetic characteristics, recording/reproduction characteristics and practically sufficient thermal stability. More concretely, it is necessary to use a magnetic film that has low noise by rendering crystal grains fine, and uses AF coupling to suppress thermal decay. To further improve these characteristics of the medium, it is effective to improve crystallographic orientation inside a plane of a magnetic film formed of a Co base alloy having a hexagonal closed packed structure. When in-plane orientation of the magnetic film can be improved, magnetocrystalline anisotropy becomes strong in the in-plane direction, and coercivity of the magnetic characteristics, coercive squareness and remanence magnetization increase with the result of the improvement in recording/reproduction characteristics.

SUMMARY OF THE INVENTION

It is an object of this invention to provide a magnetic recording medium for a magnetic storage device, capable of high-density recording and reproduction of information and having less degradation of reproduction signals due to thermal decay, and a manufacturing method of the magnetic recording medium.

In the invention, the (11.0) crystallographic orientation is improved for a substrate surface of a magnetic film formed of a Co base alloy having a hexagonal closed packed structure. This (11.0) crystallographic orientation preferably has higher (11.0) diffraction intensity by X-ray diffraction so long as the size of the crystal grains remains substantially the same, and can be evaluated as having smaller dispersion of orientation and higher crystallographic orientation when a half value width of a locking curve of a (11.0) diffraction peaks is smaller.

In a magnetic recording medium including a first underlying film formed of a NiTa alloy having a nonmagnetic amorphous structure and deposited on a nonmagnetic substrate such as reinforced glass, and a second underlying film formed of an alloy containing at least Cr and Ti, a first magnetic film formed of a CoCrPt alloy, a nonmagnetic intermediate film formed of Ru and a second magnetic film formed of a CoCrPtB alloy that are serially formed over the first underlying film, the object of the invention described above can be accomplished by a magnetic recording medium wherein an interface between the first underlying film and the second underlying film is suitably oxidized. The existence of oxygen can be observed as a peak of an oxygen component in a depth profile by SIMS secondary ion mass spectroscopy.

A Pt concentration of the CoCrPt alloy film as the first magnetic film is set to about 8 at % or below so that an anisotropy field Hk of this CoCrPt alloy film is not greater than 800 kA/m and a recording head can more easily write information.

The Pt concentration is set to at least about 3 at % so as to keep lattice matching with the CrTi alloy as the second underlying film. To improve the (11.0) crystallographic orientation of the CoCrPtB alloy film as the second magnetic film, it is necessary to orient the CrTi alloy film as the second underlying film having the body-centered cubic structure to a 200orientation and to epitaxially orient the CoCrPt alloy film as the first magnetic film having the hexagonal closed packed structure on the former to the (11.0) crystallographic orientation.

A Ru film is formed as the nonmagnetic intermediate film between the first and second magnetic films. This Ru film has the hexagonal closed packed structure in the same way as the first and second magnetic films, and its film thickness is about 0.5 nm. Because Ru is formed to only several atomic layers, it hardly affects crystallographic orientation.

The closer the length of $\sqrt{0}2\times$ a of the CrTi alloy film to the length of c of the CoCrPt alloy film, the more smoothly the first second magnetic film can be formed on the second underlying film without distortion. Consequently, the (11.0) crystallographic orientation of the first and second magnetic films can be improved. When the Ti concentration of the CrTi alloy film as the second underlying film is higher than about 15 at %, the crystallographic orientation gets deteriorated because the difference of the lattice constant from that of the CoCrPt alloy film as the second magnetic film becomes greater.

When the Ti concentration of the CrTi alloy film is smaller than about 10 at %, on the other hand, the crystal grains of the first and second magnetic films deposited over the CrTi alloy film become greater, too, so that the medium noise undesirably increases.

As the film thickness of the underlying film becomes smaller, the crystal grains become smaller, and the medium noise can be reduced during recording and reproduction. When the underlying film becomes thin, however, the (11.0) crystallographic orientation of the magnetic film is generally likely to get deteriorated. In this case, coercivity and remanence magnetization become smaller and the reproduction output drops. According to embodiments of the invention, a half value width of a locking curve of a (11.0) diffraction peak can keep at least about 8° even when the film thickness of the second underlying film is within a small range of 5 nm to 15 nm. Since the medium noise can be reduced without lowering the reproduction output, S/N can be improved. This (11.0) diffraction peak is observed as a single peak because the peak by the first magnetic film overlaps with that of the second magnetic film.

To appropriately oxide the interface between the first and second underlying films in the magnetic recording medium according to the invention, the first underlying film is formed and then its surface is exposed to a trace amount of an oxygen gas so that a product ($PO_2 \cdot t$) of an oxygen partial pressure and the exposure time to the atmosphere is 15 (mPa·sec) to 35 (mPa·sec) when the second underlying film is formed of CrTi, and 20 (mPa·sec) to 40 (mPa·sec) when it is formed of CrTiB, before the second underlying film is formed.

Carbon is further formed as a protective film of the second magnetic film to a thickness of 3 nm to 5 nm on the second magnetic film, and a lubricant layer of adsorptive perfluoroalkeylpolyether is disposed on a thickness of 1 nm to 2 nm. There is thus obtained a magnetic recording medium having high reliability and capable of high-density recording.

When a hydrogen-containing carbon film, a film formed of a carbide such as silicon carbide or tungsten carbide, or a mixed film of these compounds with carbon is used as the protective film, slide resistance and corrosion resistance can be improved advantageously.

When a reproduction portion of a magnetic head is constituted by a magnetoresistive head in a magnetic disk apparatus including the magnetic recording medium described above, a driving portion for driving the magnetic recording medium in a recording direction, the magnetic head having a recording portion and a reproduction portion, means for relatively moving the magnetic head to the magnetic recording medium and recording/reproduction signal processing means for executing signal input to the magnetic head and reproducing output signals from the magnetic head, a magnetic disk apparatus can be accomplished that can acquire sufficient signal intensity in high-density recording and has recording density of at least 46.5 $Mbit/mm^2$.

Other objects, features and advantages of the invention will become apparent from the following description of the embodiments of the invention taken in conjunction with the accompanying drawings.

BRIEF DESCRIPTION OF THE DRAWINGS

FIG. 6 is a table useful for explaining magnetic characteristics and recording/reproduction performance of an example of the invention and those of Comparative Examples.

DESCRIPTION OF THE EMBODIMENTS

EXAMPLE 1

Figure 1:
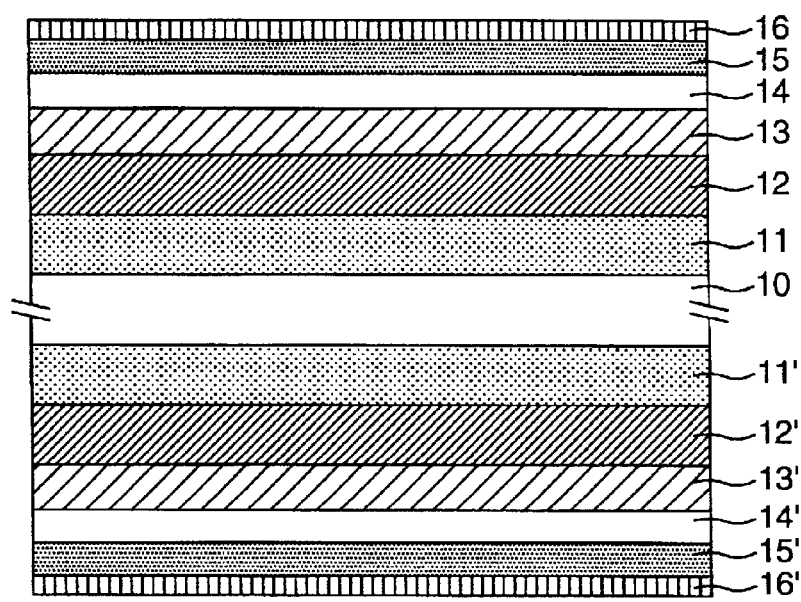
FIG. 1 is a model view showing an example of a sectional structure of a magnetic recording medium according to the present invention.

FIG. 1 shows a film structure of a magnetic recording medium according to an embodiment of the present invention.

A substrate 10 uses 2.5-inch type aluminosilicate that is chemically reinforced. Over this substrate 10, the following films are formed serially thereon: first underlying films 11 and 11' formed of a 62 at % Ni–38 at % Ta alloy to a thickness of 30 nm; second underlying films 12 and 12' formed of an 85 at % Cr–15 at % Ti alloy to a thickness of 5 nm; first magnetic films 13 and 13' formed of a 75 at % Co–19 at % Cr –6 at % Pt alloy to a thickness of 4 nm; nonmagnetic intermediate films 14 and 14' formed of Ru to a thickness of 0.5 nm; second magnetic films 15 and 15' formed of a 60 at % Co–20 at % Cr–14 at % Pt–6 at % B alloy to a thickness of 15.5 nm; and carbon protective films 16 and 16' to a thickness of 3.5 nm.

Figure 2:
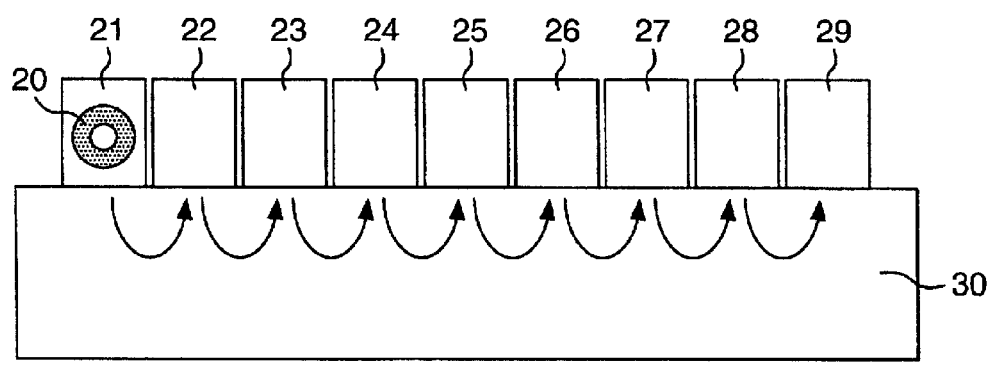
FIG. 2 is a model view showing an example of a film formation apparatus for the magnetic recording medium.

A sheet type sputtering apparatus "mdp250B" of Intervac Co. is used as a film formation apparatus and a film is formed at tact of 6.8 sec. An argon (Ar) pressure used for forming each film is 0.8 Pa in all cases. An oxygen partial pressure of a main chamber 30 (see FIG. 2)is about $7 \times 10^{-7}$ (Pa) during film formation. FIG. 2 shows a chamber construction of this sputtering apparatus. Incidentally, a substrate 20 is set into a feed chamber 21 and is withdrawn from a withdrawal chamber 29 after predetermined film formation is completed.

The first underlying film is formed in a first underlying film formation chamber 22 while the substrate is not heated. The first underlying film is heated to about 250° C. by a lamp heater inside a heat/oxidation chamber 23 and is exposed to an atmosphere of a 99% Ar–1% $O_2$ mixed gas at a pressure of 0.6 Pa for 4 seconds. The other films are serially formed thereafter over the first underlying film in a second underlying film formation chamber 24, a first magnetic film formation chamber 25, a nonmagnetic intermediate film formation chamber 26, a second magnetic film formation chamber 27 and a protective film formation chamber 28. In this instance, $PO_2 \cdot t$ corresponds to 0.6 Pa×0.01×4 sec =24 (mPa·sec). After the films are formed till the carbon protective film, a film of a composition prepared by diluting a perfluoroalkylpolyether type material with fluorocarbon is applied as a lubricant layer to a thickness of 1.8 nm.

EXAMPLE 2

A second magnetic recording medium is manufactured to substantially the same film structure and by substantially the same manufacturing method as those of Example 1. However, the following points are changed. The second underlying films 13 and 13' are formed of 82 at % Cr–15 at % Ti–3 at % B alloy and its thickness is changed to 10 nm. The pressure of the 99% Ar–1% $O_2$ mixed gas is changed to 0.8 Pa.

In this instance, $PO_2 \cdot t$ corresponds to 32 mPa·sec.

Figure 3:
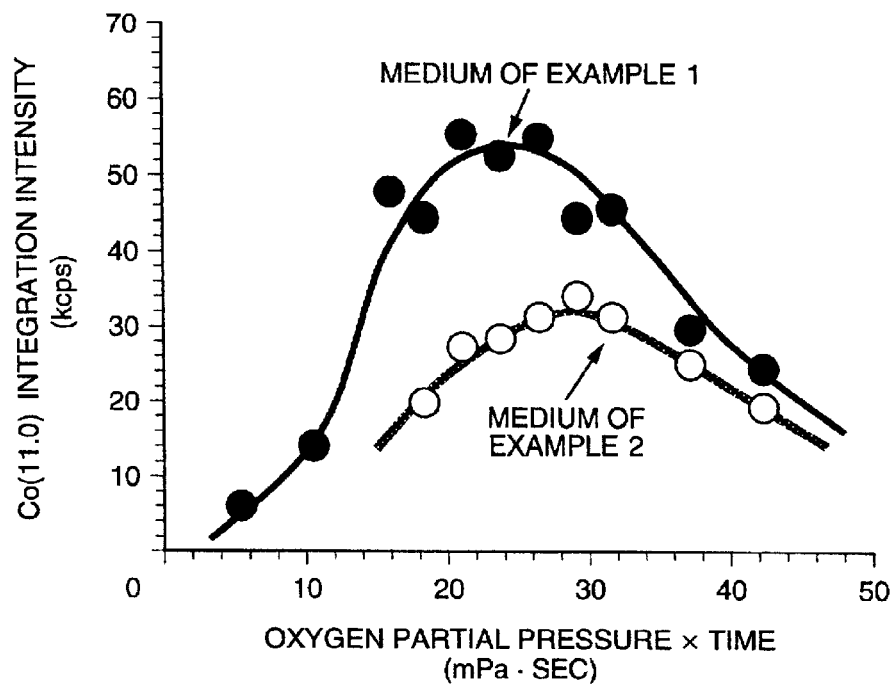
FIG. 3 is a graph showing crystallographic orientation of a magnetic film in the magnetic recording medium according to the invention.

FIG. 3 shows the change of crystallographic orientation (Co (11.0) integration intensity)of the first and second magnetic films in the magnetic recording media manufactured when $PO_2 \cdot t$ is 5 (mPa·sec) to 43 (mPa·sec). Here, the (11.0) crystallographic orientation is measured by an X-ray diffraction method using Cu-Kα rays and is evaluated by integration intensity of the (11.0) diffraction peaks.

The (11.0) diffraction peaks of the first and second magnetic films overlap with each other and are observed as a single peak. As can be seen from FIG. 3, the Co(11.0) integration intensity is high and the (11.0) crystallographic orientation is improved when $PO_2 \cdot t$ is from 15 (mPa·sec) to 35 (mPa·sec) in the case where the second underlying film is formed of CrTi and when $PO_2 \cdot t$ is from 20 (mPa·sec) to 40 (mPa·sec) in the case where the second underlying film is formed of CrTiB. When dispersion of crystallographic orientation is evaluated by a half value width of a locking curve, the medium of Example 1 has a value of 6.80 and the medium of Example 2, 7.8°.

Figure 4:
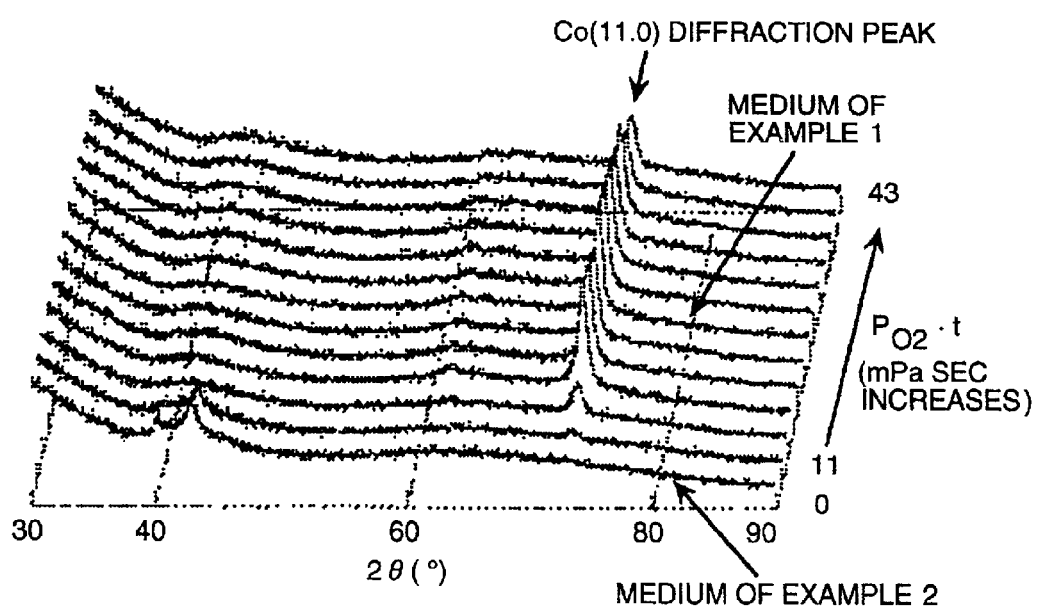
FIG. 4 shows an X-ray diffraction pattern of an example of the magnetic recording medium according to the invention and that of a comparative medium.

FIG. 4 shows an X-ray diffraction profile when the medium of Example 1 is measured by X-ray diffraction. The diffraction peak corresponding to the magnetic film is only (11.0) within the range of $PO_2 \cdot t$ where Co(11.0) is strong, and diffraction peaks of other crystallographic planes are not observed. When the profile in the depth-wise direction from the surface of the medium is evaluated by SIM analysis, the peak of oxygen is observed in the proximity of the interface between the first and second underlying films. When the sectional structure is observed through a transmission electron microscope, however, a new layer due to this oxygen is not distinctively observed in the interface between the first and second underlying films. After all, oxygen is assumed as locally dispersed.

Figure 5:
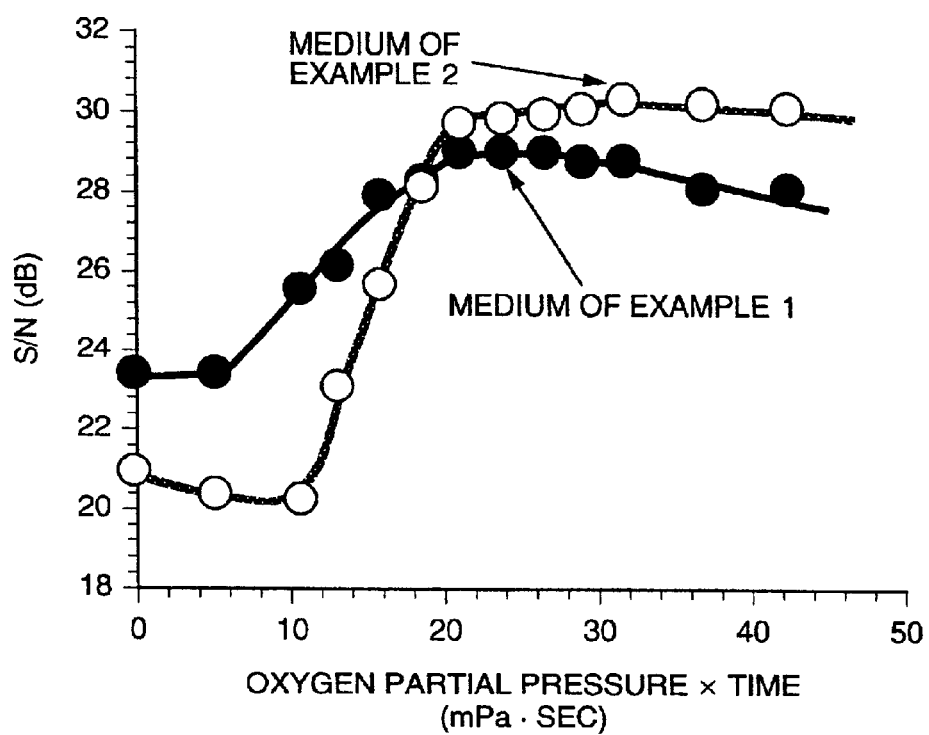
FIG. 5 is a graph showing a signal-to-noise ratio (S/N) in the magnetic recording medium according to the invention.

FIG. 5 shows the evaluation result of S/N in recording/reproduction performance of the magnetic recording medium shown in FIG. 3. Here, S/N represents a ratio of an amplitude (peak to peak)of an isolated read output to a medium noise N at a linear recording density of flux reversal of 25,000 times/mm in a magnetic disk apparatus condition of 51 Mbits (at linear recording density of 595 kBPI, track density of 55 kTPI)/mm² as a plane recording density.

In the media of Examples 1 and 2 shown in FIG. 3, S/N becomes high within the range of $PO_2 \cdot t$ where the Co(11.0) integration intensity becomes high, and the medium of Example 1 satisfies the apparatus specification of the plane recording density of 48 Mbits/mm². Further, the medium of Example 2 satisfies the apparatus specification of the plane recording density of 51 Mbits/mm².

FIG. 6 shows recording characteristics and recording/reproduction characteristics of the Examples of the invention and those of Comparative Examples on which manufacturing conditions are imposed.

Comparative Example 1

A magnetic recording medium of Comparative Example 1 is manufactured to the same film structure by the same manufacturing method as those in Example 1 with the exception that the 99% Ar–1% $O_2$ mixed gas is not supplied to the heat/oxidation chamber 23 in Example 1.

Comparative Example 2

A magnetic recording medium of Comparative Example 2 is manufactured to the same film structure by the same manufacturing method as those in Example 2 with the exception that the 99% Ar–1 % $O_2$ mixed gas is not supplied to the heat/oxidation chamber 23 in Example 2.

Comparative Example 3

A magnetic recording medium of Comparative Example 3 is manufactured to the same film structure by the same manufacturing method as those in Example 2 with the exception that the material of the second underlying films 12, 12' is changed to a 77 at % Cr –20 at % Ti–3 at % B alloy in Example 2.

EXAMPLE 3

A magnetic recording medium of Example 3 is manufactured to the same film structure by the same manufacturing method as those in Example 2 with the exception that the thickness of the second underlying films 13, 13' is changed to 15 nm and the thickness of the second magnetic films 15 and 15' is changed to 17 nm in Example 2.

In the media of all of Examples, the first magnetic film and the second magnetic film are antiferromagnetically bonded through the nonmagnetic intermediate layer, and this AF bonding is confirmed by the step in the first quadrant of the hysteresis curve by VSM (vibrating sample magnetometer). The field intensity at which the step develops is 40 kA/m to 70 kA/m in the media of all Examples, and a relatively large AF bonding magnetic field acts as the medium.

Referring to FIG. 6, the magnetic characteristics are measured by a remanence magnetization curve. Mrt represents a magnetic moment per unit area. Hr represents a residual coercive force. The recording and reproduction characteristic is evaluated by a ratio (S/N) of an amplitude S (peak to peak) of an isolated read output to a medium noise N at a linear recording density of flux reversal (25,000 fr/mm) of 25,000 times/mm in a magnetic disk apparatus condition of 51 Mbits (at linear recording density of 595 kBPI, track density of 55 kTPI)/mm$^2$ as a plane recording density and by a ratio (Re) of a read output at flux reversal of 12,500 fr/mm to an isolated read output.

The plane recording density of the magnetic disk apparatus can be improved much more with greater S/N and greater Re. When Examples 1 and 2 are compared with Comparative Examples 1 and 2, performance values can be all improved as a suitable amount of oxygen is supplied between the first and second underlying films. Though a suitable amount of oxygen is supplied in Comparative Example 3, lattice matching with the 75 at % Co–19 at % Cr–6 at % Pt alloy as the first magnetic film gets inferior because the Ti concentration of the second underlying film is as high as 20 at %. Crystallographic orientation of Co (11.0) becomes inferior, too, and both Mrt and S/N get deteriorated. A thermal decay is evaluated for the medium of Example 3, and degradation of a bit error is found extremely small and provides an excellent result even when the medium is left standing at 70° C. for 100 hours.

The effects of Examples described above can also be obtained by using a film formation apparatus in which the degree of vacuum reached is lower and the oxygen partial pressure is greater than those of the film formation apparatus used in Examples of the invention, or a film formation apparatus in which the formation time from the first underlying film to the second underlying film is long as in an apparatus capable of simultaneously forming the films on a plurality of substrates, so long as the condition of $PO_2 \cdot t$ described above is satisfied.

The magnetic recording medium according to the present invention can suppress degradation of a reproduction signal resulting from thermal decay and has a higher S/N than the prior art media. When the magnetic recording medium according to the invention is used in combination with a magnetoresistive head, a magnetic storage device having a recording density of 46.5 Mbits/mm$^2$ (30 Gbits/in$^2$) or more can be achieved.

Having described a preferred embodiment of the invention with reference to the accompanying drawings, it is to be understood that the invention is not limited to the embodiment and that various changes and modifications could be made therein by one skilled in the art without departing from the spirit or scope of the invention as defined in the appended claims.

What is claimed is:

1. A magnetic recording medium including a first underlying film formed on a nonmagnetic substrate and containing a NiTa alloy having a nonmagnetic amorphous structure, and a second underlying film using an alloy containing at least Cr and Ti, further a first magnetic film using a CoCrPt alloy, a nonmagnetic intermediate film containing Ru and a second magnetic film using a CoCrPtB alloy that are serially formed over said first underlying layer, wherein oxygen exists in an interface between said first underlying film and said second underlying film; and wherein a film thickness of said second underlying film is 5 nm to 15 nm, and a half value width of a locking curve in a (11.0) diffraction peak appearing at an overlapping position of said first and second magnetic films is equal to or less than 80.

2. A magnetic recording medium according to claim 1, wherein said oxygen is locally dispersed in said interface.

3. A magnetic recording medium according to claim 1, wherein a Ti concentration of said second underlying film is 10 at % to 15 at %, and a Pt concentration of the CoCrPt alloy as said first magnetic film is 3 at % to 8 at %.

* * * * *